(12) United States Patent
Bahr et al.

(10) Patent No.: US 8,496,180 B2
(45) Date of Patent: Jul. 30, 2013

(54) MANAGING MOBILE DEVICE INTERACTIONS USING BARCODES

(75) Inventors: John Bahr, Superior, CO (US); Scott Hallowell, Arvada, CO (US); Aaron Bell, Denver, CO (US); Christopher Piekarski, Louisville, CO (US)

(73) Assignee: Polycom, Inc., San Jose, CA (US)

( * ) Notice: Subject to any disclaimer, the term of this patent is extended or adjusted under 35 U.S.C. 154(b) by 0 days.

(21) Appl. No.: 13/207,929

(22) Filed: Aug. 11, 2011

(65) Prior Publication Data

US 2012/0061458 A1 Mar. 15, 2012

Related U.S. Application Data

(60) Provisional application No. 61/382,751, filed on Sep. 14, 2010.

(51) Int. Cl.
*G06K 7/10* (2006.01)
(52) U.S. Cl.
USPC .................................. 235/472.01; 235/462.01
(58) Field of Classification Search
USPC ................... 235/472.01, 472.02, 462.01, 375
See application file for complete search history.

(56) References Cited

U.S. PATENT DOCUMENTS

| | | | | |
|---|---|---|---|---|
| 5,826,193 A | * | 10/1998 | Ghisler et al. | ................. 455/445 |
| 6,149,063 A | * | 11/2000 | Reynolds et al. | ......... 235/472.02 |
| 6,561,428 B2 | * | 5/2003 | Meier et al. | .............. 235/462.25 |
| 2002/0082931 A1 | * | 6/2002 | Siegel et al. | ..................... 705/26 |
| 2005/0082371 A1 | * | 4/2005 | Schmidt et al. | .......... 235/462.45 |
| 2011/0168779 A1 | * | 7/2011 | Wang et al. | .............. 235/462.46 |

OTHER PUBLICATIONS

"Phaser Series Scanner" Product Reference Guide, © 1998 by Symbol Technologies, Inc., 146 pages.

* cited by examiner

*Primary Examiner* — Ahshik Kim
(74) *Attorney, Agent, or Firm* — Wong, Cabello, Lutsch, Ruthorford & Brucculeri, L.L.P.

(57) ABSTRACT

A system allows a connecting a mobile device with a barcode scanner to a stationary device by scanning a barcode displayed on a display of the stationary device. The system allows connecting only one mobile device to the stationary device at any given time and allows connecting the mobile device to only one stationary device at any given time. Once connected to the stationary device, the mobile device may be used to scan additional printed barcodes and barcodes displayed by the stationary device or elsewhere, sending data corresponding to the scanned barcodes to the stationary device as if the data were entered by an input device of the stationary device. The barcode scanning functionality may also allow other ways of controlling the mobile device, including performing speed dialing, call transfer, or other telephone functionality based on barcode scanning Encryption and other similar techniques may be employed for additional security.

28 Claims, 7 Drawing Sheets

MANAGING MOBILE DEVICE INTERACTIONS USING BARCODES

CROSS REFERENCE TO RELATED APPLICATIONS

This Application claims priority to U.S. Provisional Application Ser. No. 61/382,751 entitled "Managing Interaction Between Mobile Devices and Computers Using Barcodes" filed Sep. 14, 2010 and which is incorporated by reference in its entirety herein.

TECHNICAL FIELD

The present invention relates to the field of mobile networking devices, and in particular to a method for managing dynamic connections between mobile devices and computers.

BACKGROUND ART

Communicating between mobile devices that may be carried from place to place and a stationary devices is important for many types of situations. For example, in some hospitals, nurses are given an arbitrary phone to carry with them while making their rounds. The phone is tied to the hospital ward, but often not to the specific nurse. In addition, there may be either a computer in each hospital room or mobile computers on wheels that are used to access patient records. Nurses are very mobile and will often use many computers during the course of a day. Nurses have desired a way to faciltate entry of barcode data into the patient record or other healthcare applications running on the computer.

One problem is that one of a large number of mobile scanning devices must be temporarily connected to one of a large number of computers. Existing solutions, such as BLUETOOTH® equipment (BLUETOOTH is a registered trademark of Bluetooth SIG, Inc.), offer a mechanism to manage this pairing relationship, however there are a number of issues that BLUETOOTH pairing does not solve:

1) As phones or computers are replaced due to failure, upgrade, or other reasons, the management of the list of pairings between the phones and the computers becomes extremely difficult due to the number of permutations that must be managed.

2) Determining which computer a user is paired to is difficult without a lot of user interaction on the computer, and users cannot afford to spend time on that determination.

Another problem is that printed barcodes affixed to computers and used for identification of those computers by barcode scanning devices can be damaged, become out of date, or be removed.

Existing solutions attempt to address these issues but lack the simplicity for the user as well as security and administrative control required for hospitals attempting to comply with privacy laws such as the Health Insurance Portability and Accountability Act (HIPAA). A way to simplify a mobile device user's required actions to make/break a connection, as well as to simplify the management effort to allow customers to connect many mobile scanning devices to many fixed or mobile computers has long been desired.

SUMMARY OF INVENTION

Various embodiments provide systems and methods for a mobile device to connect to a stationary device on a common network by scanning on the mobile device a barcode displayed by the stationary device. One mobile device at a time may be connected to the stationary device and one mobile device may only connect to one stationary device at a time. Additional barcodes displayed by the stationary device, or elsewhere, and scanned by the mobile device may generate textual input that is sent from the mobile device to the stationary device as if it were entered by a user at a keyboard or other input device of the stationary device.

In one embodiment, the mobile device may scan a barcode from any source and use the barcode to control the mobile device, for example dialing a telephone number indicated by the barcode, transferring a phone call to a phone number indicated by the barcode, accessing a website in a browser software of the mobile device, or configuring the mobile device.

BRIEF DESCRIPTION OF DRAWINGS

The accompanying drawings, which are incorporated in and constitute a part of this specification, illustrate an implementation of apparatus and methods consistent with the present invention and, together with the detailed description, serve to explain advantages and principles consistent with the invention. In the drawings.

DESCRIPTION OF EMBODIMENTS

Figure 1:
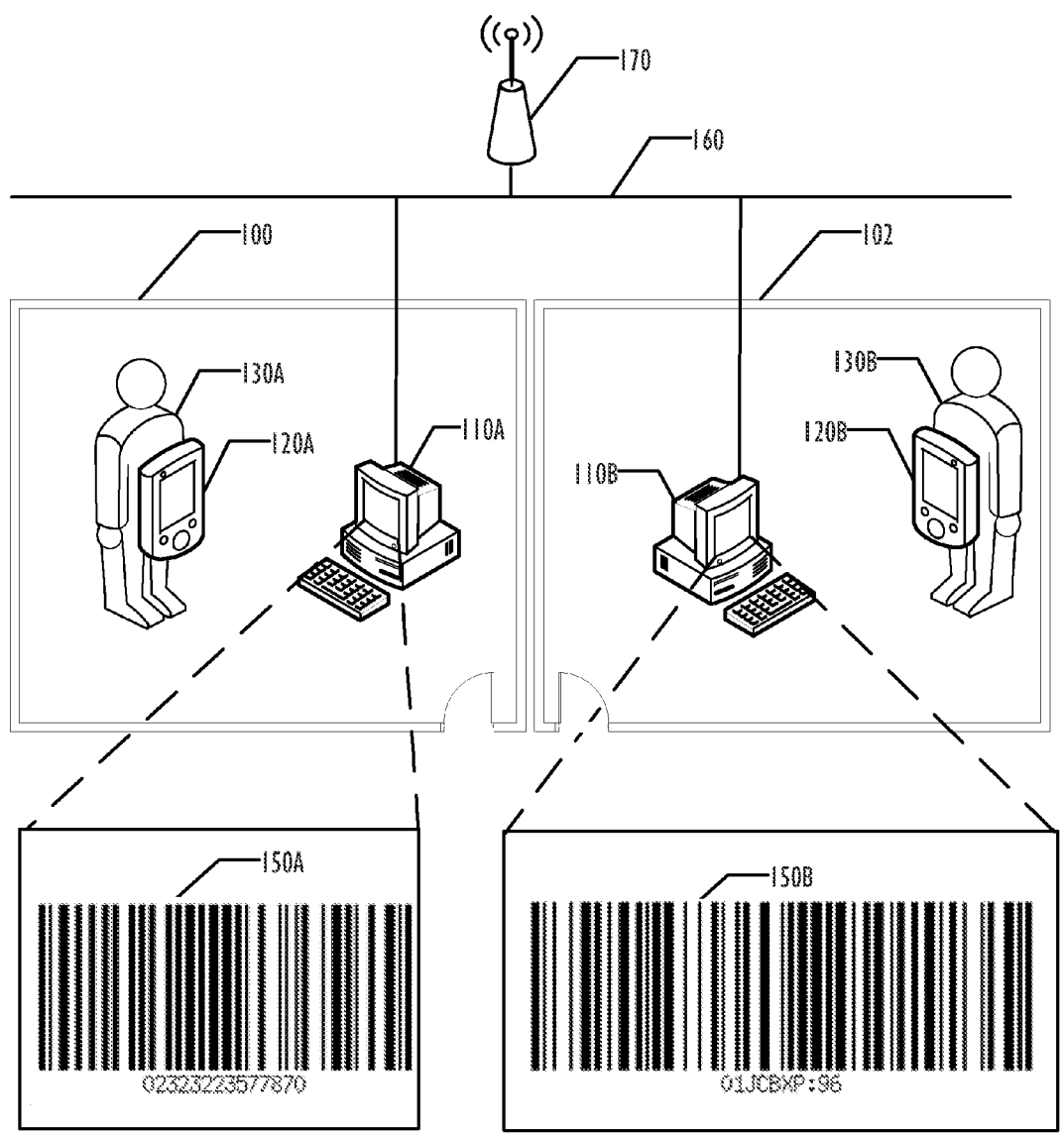
FIG. 1 is a block diagram illustrating a system for managing dynamic connections between mobile and stationary devices according to one embodiment.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

A system according to one embodiment manages dynamic connections between multiple mobile devices that include barcode scanners and multiple stationary devices, which may be computers, using barcodes displayed on the stationary devices. Although described in terms of multiple mobile devices and multiple stationary devices, the techniques described herein function equally as well with a single mobile device and a single stationary device. In one embodiment, the mobile device is a wireless telephone; in other embodiments, other types of mobile wireless devices may be used.

Although the description below is written in terms of mobile devices and stationary devices, the terms "mobile device" and "stationary device" are used solely to identify their respective roles and do not imply any physical constraints on the devices. A mobile device need not be a handheld unit and a stationary device need not be fixed to one location, but may be itself movable.

Although the description below is written in terms of barcodes, the techniques described below are not limited to any specific form of encoding, but can be used with any optical machine-readable representation of data, including linear barcodes and matrix (2D) barcodes. Although most barcodes are black and white, some vendors have introduced barcodes that encode data using color elements instead of black and white. For example, Microsoft Corporation has developed a 2D barcode known as a High Capacity Color Barcode (HCCB) that uses clusters of colored triangles instead of square black and white pixels as used in many other 2D barcodes.

In addition to the mobile device and stationary device, embodiments described herein comprise software in each mobile device and software in each stationary device. The stationary device software facilitates the display of the address (such as an Internet Protocol (IP) address or a Partial/Fully Qualified Domain Name; other address types could be used) of the stationary device as a barcode on the display and listens for connection attempts by mobile devices. The barcode is displayed on the display in a way that makes it easy for a user to scan it even given the normal lack of reflectivity of displays that would reflect a scanner aiming reference line/pattern. In one embodiment, the display of the barcode is tied to a connection engine in the software so that it disappears when the connection is made, thus giving the user reinforcing feedback that the scan and connection was successful. The software can also display the current connection status of the stationary device thus alerting anyone of a current connection, and which mobile device is currently connected to the stationary device. That connection may be terminated if another mobile device starts a connection with the stationary device or if a user of the mobile device starts a connection between the current mobile device and a different stationary device.

The mobile device software facilitates reading and decoding the barcode displayed on the stationary device and initiates a connection attempt stationary device using the scanned address to direct the connection attempt. The user does not need to do anything special on the mobile device to initiate the connection beyond simply scanning the barcode displayed on the target stationary device. A method of manually terminating the connection from the mobile device may be provided in some embodiments.

In one embodiment, the system guarantees that no more than one mobile device is connected to a stationary device and that a mobile device is not connected to more than one stationary device. Configurable timeouts allow shutting down connections automatically if the user forgets to, or chooses not to, terminate them manually.

In one embodiment, security may be accomplished through authentication using a common shared secret between stationary devices and mobile devices, as well as encryption of all data.

The techniques described herein generally do not require a central server to which the stationary device or mobile device must interact to make the connection between the stationary device and mobile device. Because of the problems with printed barcodes that are affixed to the stationary devices, such as damage to or removal of the label or tag on which the barcode is printed, embodiments preferably use a barcode displayed on a screen of the stationary device. Using a displayed barcode further helps assure that the barcode is up to date and appropriate for that stationary device, although printed barcodes may be used instead of or in addition to barcodes displayed on the screen.

In one embodiment, no customization is required of the mobile devices or stationary devices, other than installation of relevant software and configuration options, allowing easy swapping of components for maintenance of the equipment.

FIG. 1 is a block diagram that illustrates a system according to one embodiment. In this example, person 130A carries a mobile device 120A. Similarly, person 130B carries a mobile device 120B. Person 130A enters room 100, which contains stationary device 110A, and can wirelessly connect the mobile device 120A to stationary device 110A by scanning a barcode 150A displayed on a screen of stationary device 110A. Similarly, person 130B can enter room 102 and connect mobile device 120B to stationary device 110B by scanning barcode 150B.

Stationary device 110 may be a computer, such as a desktop or laptop PC or any other type of device that can display a barcode and establish communications with other devices using predefined communications protocols, including Internet Protocol (IP). Although designated a stationary device, the devices 110 may themselves be movable, such as a laptop computer, and may include mobile devices such as the mobile device 120, so long as the devices 110 can display barcodes and accept connections from the mobile devices 120. The stationary devices 110 connect through wired or wireless connections to a network reachable by the mobile devices 120.

Embodiments may provide a single stationary device 110 or a plurality of stationary devices 110, although the latter is a more typical configuration. Similarly, embodiments may provide a single mobile device 120, which can connect to any one of the plurality of stationary devices 110, although the typical configuration includes a plurality of mobile devices 120 and stationary devices 110. Although illustrated in FIG. 1 as being in different rooms, a plurality of stationary devices 110 may be used in a single location, including immediately adjacent to each other, without interfering with each other.

The connectivity between mobile devices 120 and the stationary devices 110 may be a one-to-one temporary connection. In various embodiments, only one mobile device 120 may be connected to the stationary device 110 at any time, and a single mobile device 120 may only be connected to one stationary device 110 at any time. In one embodiment, when a mobile device 120 attempts to connect to a stationary device 110, the mobile device 120 first drops any existing connection to another stationary device 110. Similarly, a stationary device 110 may drop any existing connection to a mobile device 120 before accepting a connection to another mobile device 120.

In one embodiment, connections are temporary and expire after a predetermined amount of time. In another embodiment, connections may drop after a predetermined period of inactivity, but do not have a fixed duration. The temporary connectivity means that the person 130 carrying the mobile device 120 does not need to take an affirmative action to cause the connection to drop. For example, in a hospital setting where nurses carry mobile devices 120 from room to room, the nurse may simply walk into a room, connect to the stationary device 110 in that room, then simply walk to another room and make a new connection to the stationary device 110 in that room, without needing to expressly sign out or drop the earlier connection. Unlike systems that require pairing, such as Bluetooth connectivity, any mobile device 120 may connect to any stationary device 110 without any requirement to preregister or pair the mobile device 120 with the stationary device 110 before making the connection.

In another embodiment, the connectivity between mobile devices 120 and the stationary devices 110 may be one-to-one connections that do not terminate for lack of activity. For example, a worker in a warehouse or shipping environment may use a mobile device 120 to connect to a single stationary device 110 without moving to another stationary device 110 during the course of an entire shift, even though long periods of inactivity may occur during that shift.

In one embodiment, the scanner of the mobile device 120 is always active, allowing a person 130 to scan a barcode without starting an application on the mobile device 120. Thus, for example, a person 130 may be able to begin a telephone call on a mobile device 120 that contains mobile phone technology, and without disconnecting the phone call or requiring any action by the person 130 other than instructing the mobile device 120 to initiate scanning, which may be simply by pointing the scanner of the mobile device 120 at the barcode, scanning the barcode, and making a connection to the stationary device or performing other actions based on the barcode, as described below.

The mobile device 120 may be any type of mobile device that is capable of scanning a barcode 150 and using the scanned barcode to connect to a stationary device 110. In typical embodiments, the mobile device wirelessly communicates using a wireless access point 170 to a network 160 that is capable of reaching the stationary device 110, but in one embodiment, the mobile device 120 may use a wired connection to the network. In one embodiment, the mobile device 120 is a mobile phone that includes a scanner and software capable of decoding barcodes and using the decoded information to connect to the stationary device 110. In other embodiments, the mobile device 120 may be other types of handheld units or non-handheld devices, including devices that are moved on carts or other carrying devices from place to place.

The barcode scanner in some embodiments is integrated into the mobile device 120, but may also be a separate unit or module that is connected to the mobile device 120.

The barcodes used by the system for connecting mobile devices 120 and stationary devices 110 may be encoded in any desired encoding, including linear and 2-dimensional barcodes. In one embodiment, illustrated in FIG. 1 by barcode 150A, the barcode 150 is an encoding of an IP address using a Code 128 Codeset C encoding, together with a command code indicating that the barcode is an IP address connect barcode. In another embodiment, illustrated in FIG. 1 by barcode 150B, the barcode 150 is an encoding of a host name for the stationary device on the local area network (LAN) encoded using a Code 128 Codeset A encoding, together with a command code indicating the barcode is a hostname connect barcode. In both embodiments, as required by the Code 128 encoding, a checksum is encoded as part of the barcode. In one embodiment, both IP address connect barcodes and hostname connect barcodes may be used, with different stationary devices 110 displaying one or both of the two forms of connection barcodes.

The use of Code 128 Codeset C and Code 128 Codeset A is illustrative and by way of example only, and optical machine-readable encodings may be used as desired. Similarly, the use of IP addresses and host names is illustrative, and other networking protocols and naming conventions may be used for creating addresses for using to connect to the stationary device 110. Although illustrated in FIG. 1 with a textual display of the data encoded by the barcode below the barcode, the textual displayed may be omitted as desired and in one embodiment is optionally configurably displayable.

By using an address encoded in barcode 150, connections may be established directly between the mobile device 120 and the stationary device 110, avoiding the need for a connection from the mobile device 120 to a server to look up a coded value and obtain an address. In one embodiment, however, the barcode may be an arbitrary data that may be used as a lookup key that may return an address corresponding to the encoded arbitrary data, which can then be used to establish a connection to the stationary device 110. The lookup functionality may involve a database managed by a third device, a table maintained by the mobile device 120, or any other similar lookup functionality.

Conventional mobile phone applications that provide barcode scanning typically decode a Uniform Resource Locator (URL) encoded in the barcode, and pass the URL to a mobile phone browser application for displaying a webpage in the browser, allowing a many-to-one connection to the Web server identified by the URL. In various embodiments described herein, the connection is one-to-one, with only one mobile device 120 connectable to a stationary device 110 at any given time and only one stationary device 110 connectable to a mobile device 120 at any given time, automatically dropping old connections before establishing new ones, as described in more detail below.

In one embodiment, the mobile device 120 is a mobile phone with a dedicated barcode scanner module provisioned as part of the mobile phone. The scanner is typically constructed from a charge-coupled device (CCD) chip that is accessible by software executing in a processor of the mobile phone, although any type of optical scanning technology may be used as desired. Alternately, a mobile phone with a camera and software to control the camera may be used, although a dedicated scanner device may provide improved accuracy of scanning and ease-of-use.

Figure 2:
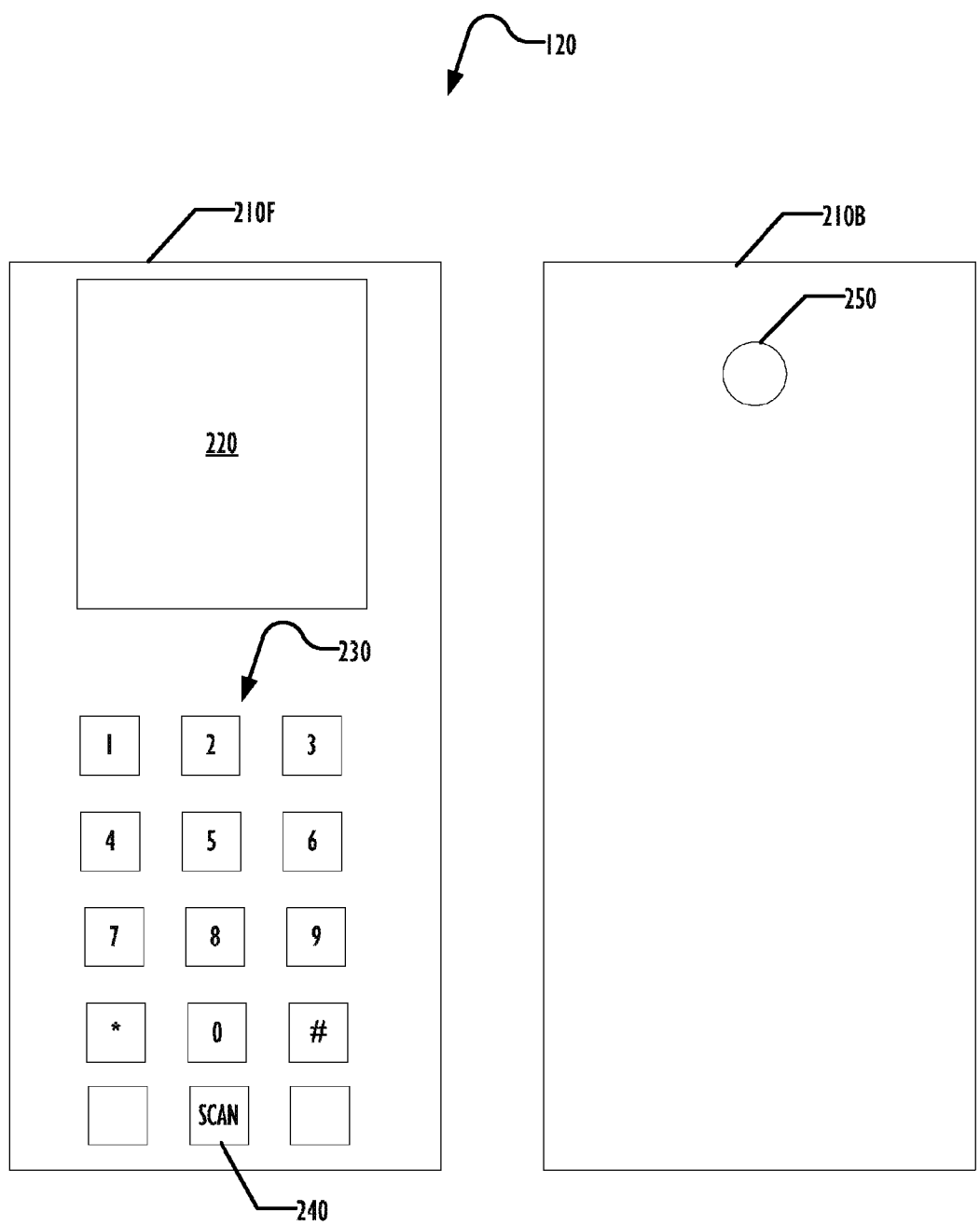
FIG. 2 is a block diagram of front and back views of a mobile device according to one embodiment.

In one embodiment, the mobile device 120 is a mobile phone, generally including features illustrated in front and back views in FIG. 2. In front view 210F, a display 220 and the keypad 230 are positioned for use by the person 130. The keypad 230 comprises a conventional telephone keypad that further includes a key 240 to initiate a scan using the scanner 250 illustrated in back view 210B. Although shown as a physical key, the scanner key 240 may be a soft key, such as a position on a touch screen. In other embodiments, the key 240 may be omitted and the software in the mobile device 120 automatically recognizes and scans barcodes by simply pointing the scanner 250 at the barcode.

In one embodiment, the stationary device 110 executes software that displays a barcode 150 on the stationary device 110's display that contains a command code telling the mobile device 120 to connect to the stationary device 110 using the IP address or hostname of the stationary device 110 on the network. The person 130 scans the information from the screen of the stationary device 110 with the mobile device 120's barcode scanner 250, then software in the mobile device 120 uses the decoded information to initiate a connection with the stationary device 110 without further need for interaction by the user. After the connection completes, further barcodes may be scanned for the duration of the connection and sent to the stationary device 110 as if the decoded data were typed by the person 130 on a keyboard or other similar input device of the stationary device 110.

The hostname may be any textual string that can be used as a name for the stationary device 110, including a name that may be resolved by a lookup request to a name server (not shown). Depending on the configuration of the network 160, the host name may be unqualified, partially qualified, or fully qualified.

In one embodiment, after scanning a connect barcode, failure to connect to the stationary device 110 within a predetermined configurable connection detection timeout period (for example, 10 seconds) may result in a failure notification alert, such as a failure tone. Successful connection may result in a success notification alert, such as a success tone. In one embodiment, if a barcode is scanned to that is not in the format of a connection command barcode while the mobile device 120 is in a connection mode, then the barcode may be silently ignored or used as data for other purposes by the mobile device 120.

In one embodiment, once a connection has been made between the mobile device 120 and the stationary device 110, a disconnect may result in a failure notification alert. This disconnect may occur if (1) a keep-alive protocol, described below, fails for a predetermined number of times; (2) no barcodes are scanned within a predetermined configurable connectivity time period; (3) the person 130 scans another stationary device 110's barcode; or (4) another person 130 attempts to connect to the same stationary device 110. In some embodiments, a key may be pressed to initiate a disconnect expressly.

In one embodiment, communication between the mobile device 120 and of the stationary device 110 may be encrypted using any desired encryption technique. In one embodiment, a configurable passphrase may be hashed using a secure hashing algorithm such as SHA-1 to form two encryption keys, one for the mobile device 120 and one for the stationary device 110, which are shared between the two devices for use with a two-way encryption algorithm such as American Encryption Standard (AES)-128 using the keys generated from the passphrase.

In one embodiment, a protocol defines the format of messages between the mobile device and the stationary device. The protocol described below is illustrative and by way of example only, and other protocols may be used for communication messages between the mobile device 120 and the stationary device 110.

In one embodiment, the scanning functionality of the mobile device 120 may be usable for scanning barcodes even when the mobile device 120 is not connected to a stationary device 110. In such an embodiment, the mobile device 120 may simply store barcodes scanned while unconnected, then after connection with the stationary device 110 is established, the stored barcodes may be uploaded to the stationary device 110.

Figure 3:
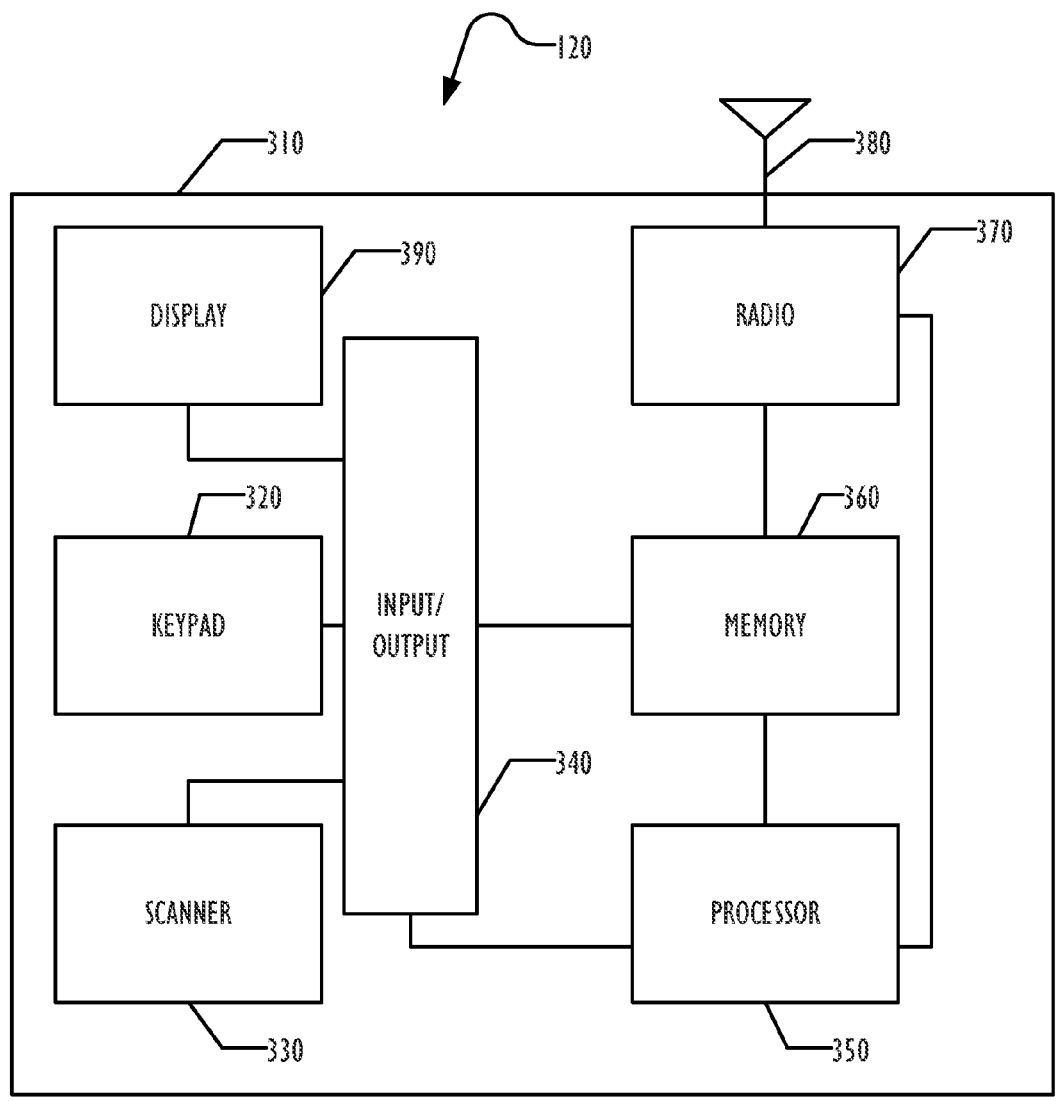
FIG. 3 is a block diagram of elements of a mobile device according to one embodiment.

Referring now to FIG. 3, an example mobile device 120 for use in connecting to a stationary device 110 is illustrated in block diagram form. Example mobile device 120 comprises a system unit 310 which may include an input device or subsystem 340, supporting keypad logic 320 for driving the keypad 230, display logic 390 for driving display 220, and scanner logic 330 for driving scanner 250. Also included with system unit 310 is a radio 370 for communication via antenna 380 with other computing devices such as the stationary device 110.

System unit 310 may be programmed to perform methods in accordance with this disclosure. System unit 310 also comprises a processor unit 350 and memory 360. Processor unit 350 may include any programmable controller device including, for example, one or more members of the Intel Atom®, Core®, Pentium® and Celeron® processor families from Intel Corporation and the Cortex® and ARMO processor families from ARM. (INTEL, INTEL ATOM, CORE, PENTIUM, and CELERON are registered trademarks of the Intel Corporation. CORTEX is a registered trademark of the ARM Limited Corporation. ARM is a registered trademark of the ARM Limited Company.) Memory 360 may include one or more memory modules and comprise random access memory (RAM), read only memory (ROM), programmable read only memory (PROM), programmable read-write memory, and solid-state memory. One of ordinary skill in the art will also recognize that processor 350 may also include some internal memory including, for example, cache memory. Storage of software to control the system unit 310 and data for use by the mobile device 120 may be provided by memory 360, another storage device (not shown) of any type known to the art, or both.

In one embodiment, the display logic 390 may display information about barcodes on the display 220. In embodiments in which the mobile device 120 stores scanned barcodes while unconnected, for uploading to a stationary device 110 upon connection, the mobile device 120 may use the display logic to display a list of stored scanned barcodes to allow a user of the mobile device 120 to preview the stored scanned barcodes. In a further embodiment, the mobile device 120 may allow a user to perform editing actions on the stored barcodes, such as deleting a stored barcode from memory 360. For example, the preview functionality may allow a user to preview the barcodes scanned by the mobile device 120 to make sure that all of a group of barcodes that should have been scanned were scanned, or to delete a barcode that was scanned multiple times.

Figure 4:
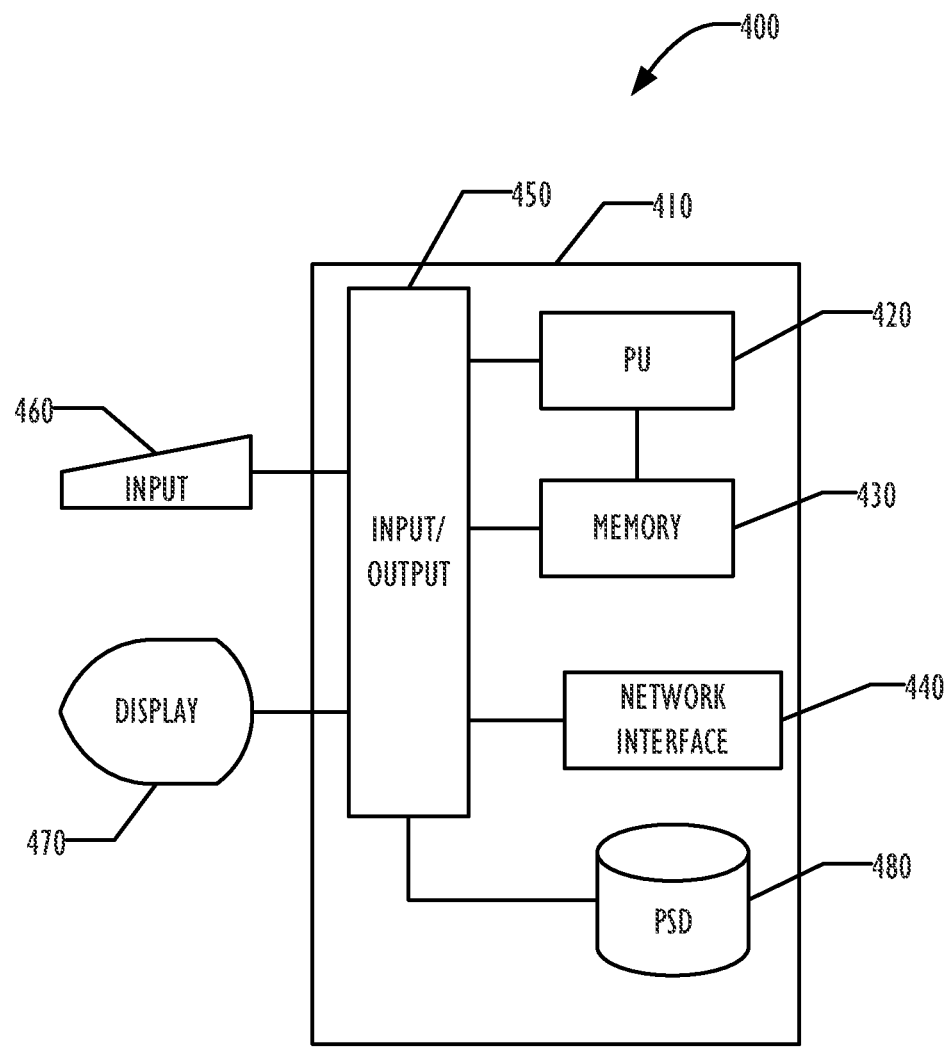
FIG. 4 is a block diagram of elements of a stationary device according to one embodiment.

Referring now to FIG. 4, an example computer 400 for use as a stationary device 110 is illustrated in block diagram form. Example computer 400 comprises a system unit 410 which may be optionally connected to an input device or system 460 (e.g., keyboard, mouse, touch screen, etc.) and display 470. A program storage device (PSD) 480 (sometimes referred to as a hard disc) is included with the system unit 410. Also included with system unit 410 is a network interface 440 for communication via a network with other computing and corporate infrastructure devices (not shown). Network interface 440 may be included within system unit 410 or be external to system unit 410. In either case, system unit 410 will be communicatively coupled to network interface 440. Program storage device 480 represents any form of non-volatile storage including, but not limited to, all forms of optical and magnetic, including solid-state, storage elements, including removable media, and may be included within system unit 410 or be external to system unit 410. Program storage device 480 may be used for storage of software to control system unit 410, data for use by the computer 400, or both.

System unit 410 may be programmed to perform methods in accordance with this disclosure. System unit 410 comprises a processor unit (PU) 420, input-output (I/O) interface 450 and memory 430. Processing unit 420 may include any programmable controller device including, for example, one or more members of the Intel Atom®, Core®, Pentium® and Celeron® processor families from Intel Corporation and the Cortex® and ARM® processor families from ARM. Memory 430 may include one or more memory modules and comprise random access memory (RAM), read only memory (ROM), programmable read only memory (PROM), programmable read-write memory, and solid-state memory. One of ordinary skill in the art will also recognize that PU 420 may also include some internal memory including, for example, cache memory.

Figure 5:
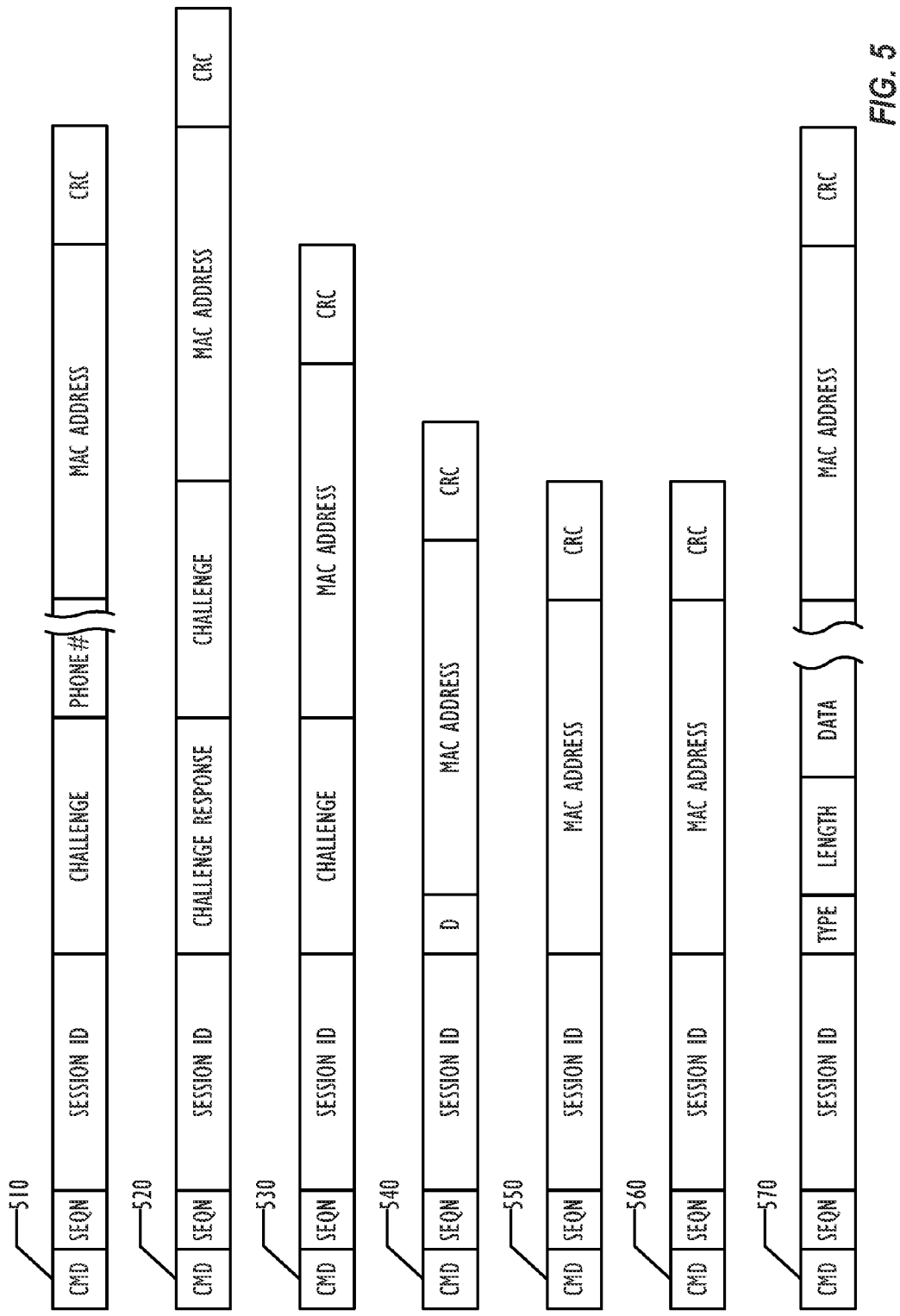
FIG. 5 is a block diagram illustrating a protocol for communicating between a mobile device and a stationary device according to one embodiment.

FIG. 5 is a block diagram illustrating an example protocol for messaging between mobile devices 120 and stationary devices 110 according to one embodiment. The protocol comprises seven types of messages: (1) connection start 510; (2) connection acknowledgement (ACK) 520; (3) connection complete 530; (4) disconnect 540; (5) keep-alive 550; (6) keep-alive ACK 560; and (7) send bar code data 570. Each message type begins with an opcode, a sequence number (initially a random number), and a session identifier. Each message ends with a Media Access Control (MAC) address for the mobile device 120 and a cyclical redundancy check (CRC) for validity checking In one embodiment, the sequence number is incremented on every message after the connect start message, and a message with an improper sequence number may be ignored.

The Connect Start message 510 is initiated by the mobile device 120 to connect to a stationary device 110. The message is considered a valid connection attempt by the stationary device 110 if the opcode is valid, the connection type matches expected connection type, and the CRC is valid. In addition to the beginning and ending fields, a Connect Start message 510 comprises (1) a challenge block containing the following data exclusive ORed (XORed) together: the opcode, the session ID, and a value that is randomly generated; and (2) a phone number.

The Connect ACK message 520 is a response sent by the stationary device 110 to a Connect Start. In addition to the beginning and ending fields, a Connect ACK message 520 comprises a challenge response field and a challenge block. The challenge response field contains the original challenge block from the Connect Start XORed with a predefined passphrase. The mobile device 120 considers the connection established if the challenge response field matches the value computed by the mobile device 120. The challenge block contains the following data XORed together: (1) the opcode; (2) the session ID; and (3) a randomly generated data.

The Connect Done message 530 is sent by the mobile device 120 as the final message in a connect sequence. In addition to the beginning and ending fields, the Connect Done message 530 comprises a challenge response block containing the original challenge block from the Connect Ack XORed with the passphrase. The stationary device 110 considers the connection established if the challenge response matches one computed by the stationary device 110.

The Disconnect message 540 can be initiated by either the mobile device 120 or the stationary device 110 to terminate a session. The stationary device 110 sends a Disconnect 540 to a mobile device 120 in a currently active session when the stationary device 110 receives a new valid Connect Start message. In addition to the beginning and ending fields, the Disconnect message 540 includes a disconnection reason field.

The Keep-Alive message 550 is initiated by the mobile device 120 to maintain a session. Failure to receive two Keep-Alive messages 550 causes the stationary device 110 to terminate the session with a Disconnect message 540.

The Keep-Alive ACK message 560 is a response by the stationary device 110 to a Keep-Alive message 550. Failure to receive two Keep-Alive Acks 560 causes the mobile device 120 to terminate the session with a Disconnect message 540.

The Send Bar Code Data message 570 is sent by the mobile device 120 and contains a scanned data string read by mobile device 120 as a barcode after decoding into text. If the total length of the data plus message overhead exceeds a maximum message size, the data may be split across two or more messages. In one embodiment, the stationary device 110 accepts the data immediately upon receipt instead of reassembling data from multiple messages. In addition to the beginning and ending fields, the Send Bar Code Data message comprises (1) a data type; (2) a data length; and (3) the actual data.

The messages described above are illustrative and by way of example only, and other protocols and message formats may be used for communicating between the mobile device 120 and the stationary device 110.

The challenge/response authentication technique described above together with a predefined passphrase provide authentication of the communications between the mobile device 120 and stationary device 110 in one embodiment. In addition, as described above, in one embodiment, all communications between the mobile device 120 and the stationary device 110 may be encrypted to provide additional security.

In one embodiment, a configuration file may be used to predefine configurable values such as timeout values by an administrator for the mobile device 120.

In one embodiment, an indication may be provided on the display 220 of the mobile device to show whether the mobile device 120 is connected to a stationary device 110.

Software on the stationary device 110 comprises two functions: (1) generating and displaying the barcode on the display 470 of the stationary device 110; and (2) handling communications between the mobile device 120 and the stationary device 110, including establishing, maintaining, and disconnecting connections, and directing barcode data from the connected mobile device 120 to the keyboard or other input queue of the stationary device 110. In one embodiment, these two functions are provided by two software components, designated herein as BCShow and BCConnect. The number, functionality, and designations for the two software components is illustrative and by way of example only. Other embodiments may use other numbers of components, including a single integrated component.

The BCShow component's main function is to generate and display a barcode containing the connect command string window when and where appropriate. Although as described above connect commands may include a barcode with an IP address or a barcode with a host name, using the IP address is preferable because it generally is a smaller length string and because using the IP address removes one step for the mobile device 120, avoiding the need for a lookup of the host name to convert it to an IP address.

In one embodiment, the BC Show component monitors the location of a mouse pointer on the display 470 of the stationary device 110. When the mouse pointer is within a configured hotspot corner area, in one embodiment, the connection barcode may slide onto the screen from a hotspot corner edge horizontally. The barcode disappears, by sliding back into the hotspot corner edge, when the mouse is moved out of the combined hotspot corner area and displayed barcode or after a successful connection is made. The sliding of the barcode helps reinforce the user's memory of where to place the mouse pointer to show the barcode the next time. In another embodiment, instead of sliding the barcode from the hotspot corner edge, the barcode may simply be displayed. In one embodiment, while on the screen the barcode is allowed to cover up any other portion of the display 470. Alternately, the barcode may be displayed by clicking on a notification area icon.

In another embodiment, in addition to or instead of using a hot spot area, the barcode may be displayed during periods of inactivity of the stationary device 110 as part of a screensaver display or other similar display.

In one embodiment, a status area may be displayed near the barcode showing a current connection status, for example, "No Connection" or "Connected to ext. 5434."

Preferably, the hot spot remains active and the barcode appears if the mouse is placed in the hotspot, even if there is a current connection with a mobile device 120. This allows another mobile device 120 to connect and disconnect the currently connected mobile device 120.

In one embodiment, the number and position of hotspots is configurable.

The BCConnect component comprises two main areas of functionality: (1) managing a network connection with a mobile device 120; and (2) inserting received barcode data into a data input queue for the stationary device 110. In one embodiment, a communications engine handles the first functionality and a key insertion engine handles the second functionality.

In one embodiment, the communications engine terminates a previous connection if a new valid Connect Start message 510 is received as described above, by sending a disconnect message with a reason code indicating another mobile device 120 is connecting. The communications engine maintains a Transmission Control Protocol (TCP) listen socket on a configured port of the stationary device 110, spawning connection sockets after a TCP connection is started from a mobile device 120.

Figure 6:
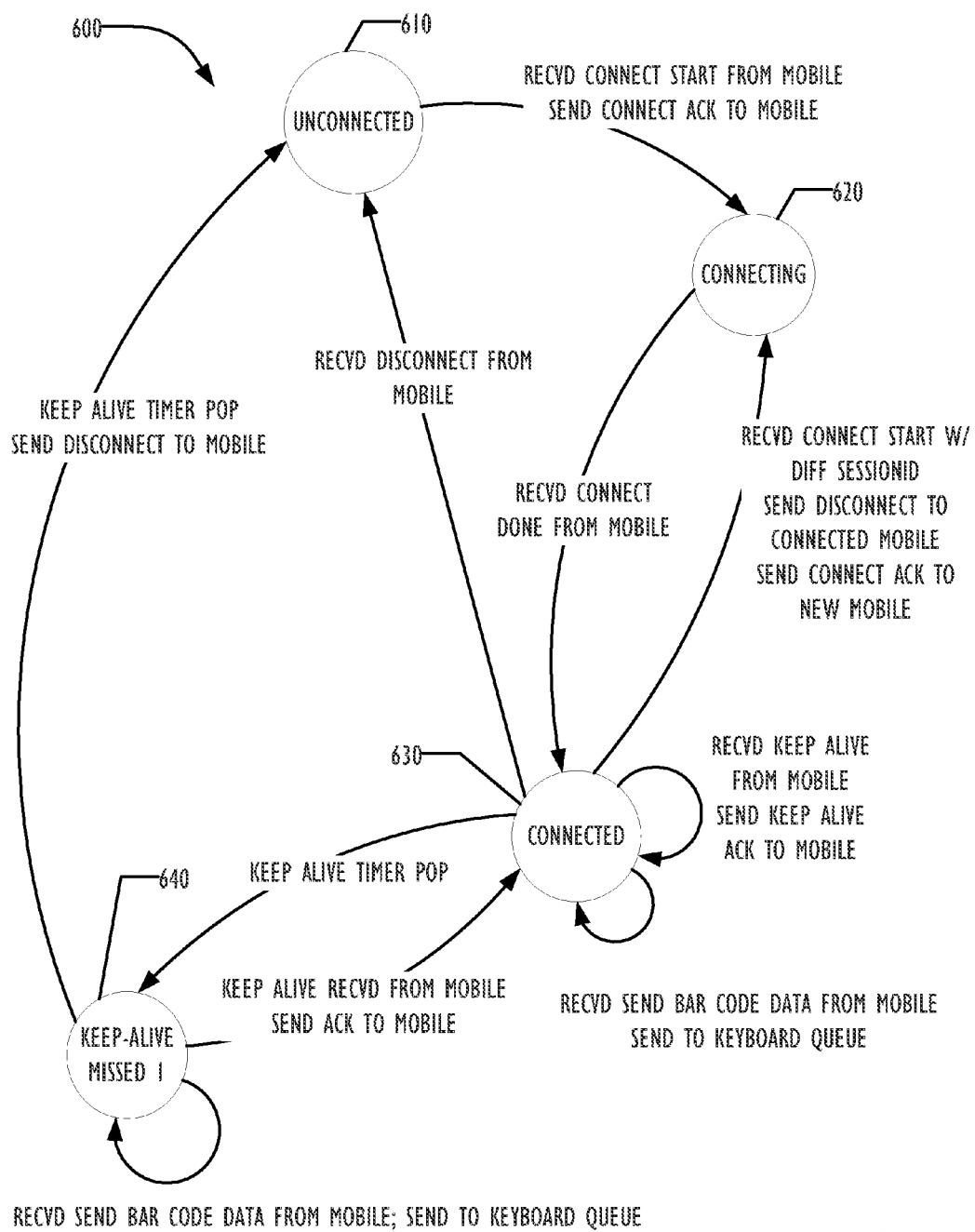
FIG. 6 is a graph illustrating a state machine for use by a stationary device according to one embodiment.

The communications engine in one embodiment may be implemented as a state machine, as illustrated in graph form in FIG. 6. In state 610, the stationary device 110 is unconnected. Upon receiving a connection start message from a mobile device 120, the communications engine sends a connect ACK message to the mobile device 120, then transitions to the connecting state 620. If the mobile device 120 fails to receive the connect ACK message, in one embodiment the mobile device may retry the connection start message one or more times before indicating a connection failure.

When the stationary device 110 receives a connection done message 530 from the mobile device 120, the communications engine transitions to the connected state 630. While in the connected state 630, if the stationary device 110 receives a connection start message 510 with a different session identifier indicating a connection is being requested by a different mobile device 120, the stationary device 110 may send a disconnect message 540 to the connected mobile device 120 and send a connect ACK 520 to the new mobile device 120, transitioning back to the connecting state 620.

While in the connected state 630, the stationary device 110 receives keep-alive messages 550 from the mobile device 120 and sends keep-alive ACKs 560 to the mobile device 120. Similarly, if the stationary device 110 while in the connected state 630 receives a send barcode data message 570 from the mobile device 120, the communications engine sends the received barcode data to the key insertion engine for insertion into the keyboard or other input queue of the stationary device 110.

While in the connected state 630, if the stationary device 110 receives a disconnect message 540 from the mobile device 120, then the communications engine transitions to the unconnected state 610.

If while in the connected state 630 a keep-alive timer expires indicating that no keep-alive message 550 has been received during the keep-alive timeout period, the communications engine transitions to the keep-alive missed 1 state 640. While in this state, if another keep-alive timer expires, then the communications engine sends a disconnect message 540 to the mobile device 120. If, on the other hand, the stationary device 110 receives a keep-alive message 550 from the mobile device 120, the communications engine sends a keep-alive ACK message 560 to the mobile device 120 and transitions back to the connected state 630. If the communications engine receives a send barcode data message 570 from the mobile device 120 while in the keep-alive missed 1 state 640, the communications engine sends the barcode data to the key insertion engine, but remains in the keep-alive missed 1 state 640.

In one embodiment, the disconnection of the mobile device 120 from the stationary device 110 may involve a localization functionality implemented either in the mobile device 120, a third device (not shown), or a combination of both. The localization functionality may be able to detect relative position of the mobile device 120, either as an absolute location or relative to the stationary device 110, and automatically signal the stationary device 110 or the mobile device 120 to trigger a disconnect if the mobile device 120 is moved away from an authorized location or greater than a predetermined distance from the stationary device 110. In one embodiment, if the mobile device 120 loses the ability to communicate to the network 160 because the WAP 170 is not reachable, the mobile device 120 may trigger a disconnect.

In one embodiment, a localization functionality may also automatically trigger a connection sequence of messages between the mobile device 120 and the stationary device 110, if the localization functionality detects that the mobile device 120 is located proximal to the stationary device 110.

The localization functionality may involve any techniques known to the art for determining the position of a wireless device, including global positioning satellite (GPS) information, signal strength determinations, or ultrasonic tagging.

The above state machine is illustrative and by way of example only, and other states and transitions between states may be used as desired. The functionality described in terms of a state machine may be implemented using techniques other than state machines.

The key insertion engine inserts strings received from the communications engine into the keyboard input queue of the stationary device 110 as if keys were pressed on the keyboard. In one embodiment, additional configured characters may be added before or after the barcode data received from the communications engine before insertion into the keyboard input queue.

In one embodiment, while the BCConnect software component is executing on the stationary device 110, a notification area icon or other indicator may be displayed to show whether the stationary device 110 is connected to a mobile device 120. In a further embodiment, the notification area icon may be clicked to cause the display of the connection barcode, similar to the display caused by positioning the mouse in a hotspot area. Upon a change in connection state, in one embodiment a notification balloon is displayed to show the change in connection state.

In order for the mobile device 120 to perform special tasks based on special barcodes, in one embodiment the connect command bar codes that are scanned by the mobile device 120 to initiate connection with the stationary device 110 are chosen to be highly unlikely to occur in a normal barcode scanned by users of the mobile device 120. For example, a commonly used barcode, the Universal Product Code (UPC), is generally 13 characters long. In one embodiment, the IP address connect command is always 14 characters long, thus is distinguishable from a UPC barcode by its length. In one embodiment, a barcode encoding and scanning logic may be customized for the disclosed system to allow distinguishing between connection barcodes and other barcodes that may be scanned based on the barcode encoding.

In one embodiment, the IP address connect barcode command begins with a 2 character command code followed by a string of digits that is a decimal representation of a IP address, followed by a checksum. In one embodiment, the hostname connect barcode command begins with a command code followed by the alphanumeric hostname, followed by a terminator character, followed by a checksum.

In one embodiment, in addition to using the barcode scanner 250 of the mobile device 120 to connect to the stationary device 110, the scanner 250 may be used as an alternative to the usually small keyboard on the mobile device 120.

On conventional mobile devices, typing long URLs to navigate to the capabilities of the device for web browsing can be cumbersome. Similarly, using the small keyboard for speed dialing or transferring phone calls can require more than a desired amount of effort.

Conventional mobile devices use speed dial menus and URL "Favorites" or "Bookmarks" to allow the user of the mobile device to choose a preconfigured or previously visited/called and saved URL, phone number, or other task. However, this involves undesirable limitations. The user still has to get to the "Favorites" menu. In the case of speed dialing, the speed dialing numbers typically must be programmed into the phone and only a limited number of speed dialing numbers are available, then the user must remember which speed-dialing keys go with which phone numbers.

In one embodiment, the barcode scanner 250 of the mobile device 120 may scan barcodes that include a command code and data to perform the desired functions. In one example usage, the command code indicates that the data part includes a URL for a desired webpage. The mobile device 120 scans the barcode, and uses the URL to open up the desired webpage in a built-in browser application, without the user needing to interact with the keypad of the mobile device 120.

In another example usage, the barcode indicates the data part is a speed dial number. Upon scanning the barcode, the phone number is extracted from the data part and is automatically dialed. In one embodiment, the user of the mobile device 120 may be asked to confirm the user wishes to dial the indicated number before placing the call.

In yet another usage example, the barcode indicates the data part is a telephone number to which a currently active call is to be transferred. Upon scanning the barcode, the mobile device 120 calls the indicated phone number and the transfers the call, then drops the line, returning to an on-hook state.

In yet another usage example, the barcode may indicate the data part is configuration information to be processed by the mobile device 120. This may allow programming optional settings of the mobile device 120 by scanning one or more barcodes configured for the desired settings. For example, the passphrase used above for security communications between the mobile device 120 and the stationary device 110 may be provided as a barcode which can be scanned and loaded into configuration memory of the mobile device, without requiring manual entry of the passphrase.

In one embodiment, the barcodes may be scanned from the display 470 of the stationary device 110 to which the mobile device is already wirelessly connected. In another embodiment, the barcodes may be scanned from any convenient display, without requiring a connection between whatever device provides the display and the mobile device 120. In yet another embodiment, the barcodes may be scanned from printed materials, such as a booklet or a printed label.

Figure 7:
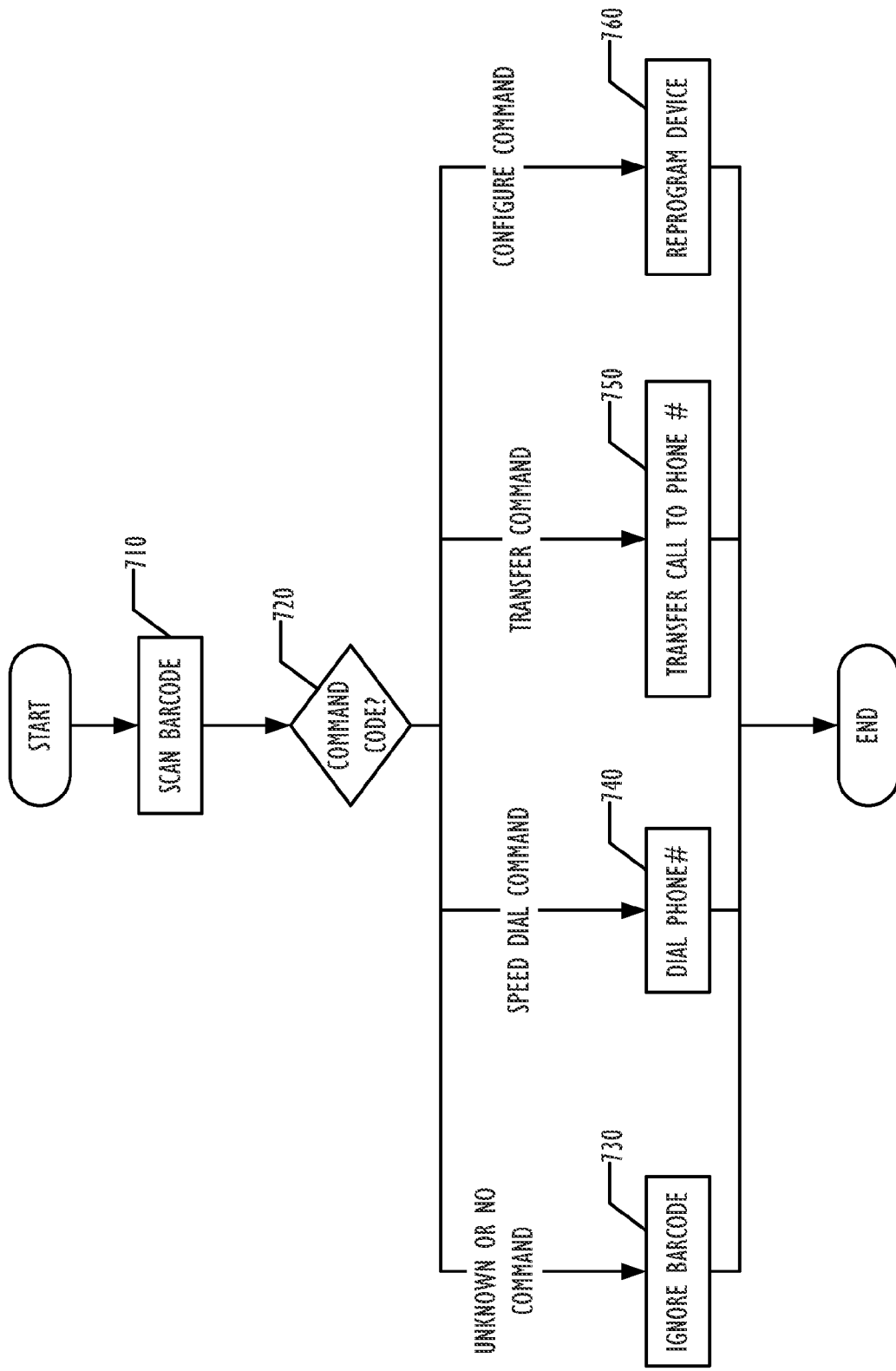
FIG. 7 is a flowchart illustrating use of a barcode for directing tasks of a mobile device according to one embodiment.

FIG. 7 is a flowchart illustrating a technique for using a barcode scanner of the mobile device 120 according to one embodiment. In block 710, the mobile device 120 scans the barcode from a display or from a printed instance of the barcode. In block 720, the software in the mobile device 120 examines the decoded barcode data and determines if it contains a command. If not, then in one embodiment the barcode may be ignored in block 730, either silently or with an alert that an unknown barcode was scanned. In one embodiment, a barcode that does not contain a command may be used in some other way as data by the mobile device 120. If the command is a speed dial command, then in block 740 the mobile device dials the phone number in the data part of the barcode. If the command is a transfer, then in block 750 the mobile device 120 transfers the call to the phone number indicated in the barcode. If the command code indicates a configuration command, then in block 760 the mobile device 120 performs the configuration change indicated by the data part of the barcode. In one embodiment, there may be a plurality of speed dial commands, each indicating a predefined a speed dial number, stored in the mobile device, allowing omission of the data part of the speed dial command. In one embodiment, there may be a plurality of configuration commands, each indicating a change to a different configuration element that may use the data part as data for programming a configuration change for the mobile device 120.

The functions described above are illustrative and by way of example only and other functions may be defined as commands to be executed by scanning and associated barcode as desired. For example, in one embodiment, barcodes could be scanned to trigger execution of associated software applications installed on the mobile device 120.

Although described above in terms of software that executes on the mobile device 120 and stationary device 110, the techniques and the functionality described above may be implemented as hardware, software, or any combination of hardware and software, and the term software should be understood to include firmware and other forms of embedded software.

The techniques described above optically link the mobile device 120 and the stationary device 110, using a display on the stationary device 110 and an imaging sensor on the mobile device 120. The linkage can be unambiguous, because one device is aimed at the other, and provides an inherent level of security because of the physical proximity required for the optical linkage, in addition to the security provided by encryption, challenge and response protocols, etc. Although described in terms of mobile and stationary devices, the embodiments described above may be implemented in any pair of devices, at least one of which can scan a display provided by the other.

In one embodiment, web certificates or other security data used by the mobile device 120 for connection to the network 160 or for connection with the stationary device 110 may be scanned using the above technique to load the certificates or other security data into the mobile device 120 to allow use of the mobile device 120 on the network 160. In one embodiment, the security data that may be scanned by the mobile device 120 may be provided in multiple barcodes, which may be scanned in any order or which must be scanned in a fixed order.

The techniques described above allow use of mobile devices 120 as interactive devices for use with the stationary devices 110. The barcode scanned by the mobile device 120 may cause the stationary device 110 or the mobile device 120 to take an action. Information needed to initiate, terminate, or manipulate the functionality of an application or a feature of an application may be scanned by the mobile device 120 and used to control the application on the stationary device 110, without requiring the person 130 to type in strings on a keyboard of the mobile device 120 or use other navigation techniques.

Although described above using barcodes, embodiments may be provided that use other forms of optical data, such as photographs, that can be scanned and recognized. Similarly, instead of scanning a fixed spatial image such as a predetermined barcode, embodiments can be implemented that recognize a time-variant imagery, where the variation of the image over time encodes data that can be recognized by the scanner to trigger functionality in the mobile device 120.

Although described above as using barcode scanning to detect barcodes 150 displayed on a display of the stationary device 110, in one embodiment, the barcodes may be printed or otherwise placed in a tangible form on or near the stationary device instead of displayed by the stationary device 110.

Although described above as allowing only one-to-one connections between mobile devices 120 and stationary devices 110, in one embodiment a stationary device 110 may maintain connections with multiple mobile devices 120 instead of dropping previous connections when a new connection is attempted. In one embodiment, a mobile device 120 may maintain connections with multiple stationary devices 110, even if each stationary device 110 may only connect with a single mobile device 120 at any given time.

The above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A system comprising:
    a network;
    a first device, connected to the network, comprising:
        a display;
        a first processor, coupled to the display; and
        a first software executed by the processor, comprising:
            logic to display a barcode on the display, wherein the barcode identifies the first device on the network; and
            logic to drop a connection between the first device and another device responsive to receiving a request to establish the connection from the second device; and
    a second device, connected to the network, comprising:
        a barcode scanner;
        a second processor, coupled to the barcode scanner; and
        a second software executed by the processor, comprising:
            logic to scan the barcode displayed on the display with the barcode scanner; and
            logic to use the barcode to establish a connection with the first device on the network.

2. The system of claim 1, wherein the second software further comprises:
    logic to drop a connection between the second device and another device responsive to scanning the barcode.

3. The system of claim 1, wherein the second device comprises a mobile phone.

4. The system of claim 1, wherein the first device comprises a personal computer.

5. The system of claim 1, wherein communications between the first device and the second device are encrypted.

6. The system of claim 1, wherein the first software further comprises:
    logic to accept a connection request from the second device; and
    logic to acknowledge the connection request to the second device.

7. The system of claim 1, wherein the second software further comprises:
    logic to send a connection request from the second device;
    logic to receive an acknowledgement of the connection request from the first device; and
    logic to send an acknowledgement that the connection is established to the first device.

8. The system of claim 1,
    wherein the second software further comprises:
        logic to scan a second barcode with the barcode scanner; and
        logic to send a first data corresponding to the second barcode to the first device; and
    wherein the first software further comprises:
        logic to receive the first data from the second device; and
        logic to process the first data as if it had been entered at an input device associated with the first device.

9. The system of claim 8, wherein the second device further comprises:
    a memory, coupled to the processor,
    wherein the second software further comprises:
        logic to store the first data corresponding to the second barcode in the memory,
    wherein the logic to send a first data corresponding to the second barcode to the first device comprises:
        logic to read the first data from the memory.

10. The system of claim 9, wherein the second device further comprises:
    a display, coupled to the processor,
    wherein the second software further comprises:
        logic to display the first data on the display; and
        logic to allow a user of the second device to edit the first data.

11. The system of claim 10, wherein the logic to allow a user of the second device to edit the first data comprises:
    logic to allow the user to delete the first data from the memory.

12. The system of claim 1, wherein the first software further comprises:
    logic to drop the connection to the second device responsive to inactivity on the connection.

13. The system of claim 1, wherein the first software further comprises:
    logic to drop the connection to the second device responsive to a disconnect request from the second device.

14. The system of claim 1, wherein the first software further comprises:
    logic to remove the barcode from the display responsive to establishing a connection to the second device.

15. The system of claim 1, wherein the barcode encodes a network address of the first device.

16. The system of claim 1, wherein the barcode encodes a name of the first device.

17. An apparatus, comprising:
a barcode scanner;
a network interface, configured for wireless connection of the apparatus to a network;
a processor, coupled to the barcode scanner and the network interface; and
software, executed by the processor, comprising:
logic to scan a first barcode displayed by a first other device;
logic to use the first barcode to establish a connection with the first other device on the network; and
logic to disconnect the connection with the first other device responsive to scanning a barcode displayed by a second other device.

18. The apparatus of claim 17, wherein the apparatus is a mobile phone.

19. The apparatus of claim 17, wherein the logic to use the first barcode to establish a connection with the first other device on the network comprises:
logic to send a connection request from the apparatus;
logic to receive an acknowledgement of the connection request from the first other device; and
logic to send an acknowledgement that the connection is established to the first other device.

20. The apparatus of claim 17, wherein the software further comprises:
logic to scan a second barcode; and
logic to send a second data corresponding to the second barcode to the first other device.

21. The apparatus of claim 20, further comprising:
a memory, coupled to the processor,
wherein the software further comprises:
logic to store the second data in the memory, and
wherein the logic to send a second data corresponding to the second barcode to the first other device comprises:
logic to read the second data from the memory.

22. The apparatus of claim 21 further comprising:
a display, coupled to the processor,
wherein the software further comprises:
logic to display the second data on the display; and
logic to allow a user of the apparatus to edit the second data.

23. The apparatus of claim 22, wherein the logic to allow a user of the apparatus to edit the second data comprises:
logic to allow the user to delete the second data from the memory.

24. A method, comprising:
displaying a first barcode by a first device;
scanning the first barcode by a second device;
connecting the second device to the first device on a network using the first barcode; and
disconnecting the second device from the first device responsive to receipt of a connection request by the first device from another device.

25. The method of claim 24, further comprising:
scanning a second barcode displayed by another device;
disconnecting the second device from the first device responsive to scanning the second barcode; and
connecting the second device to the another device on the network using the second barcode.

26. The method of claim 24, further comprising:
disconnecting the second device from the first device responsive to inactivity on a connection between the first device and the second device.

27. The method of claim 24, further comprising:
disconnecting the second device from the first device responsive to a disconnection request send from the second device to the first device.

28. A non-transitory computer readable medium, on which is stored instructions that when executed by a programmable device, cause the programmable device to perform actions comprising:
displaying a barcode on a display associated with the programmable device, wherein the barcode identifies the programmable device on a network
receiving a connection request from a first mobile device that has scanned the barcode;
establishing a connection to the first mobile device responsive to the connection request;
receiving a connection request from a second mobile device that has scanned the barcode; and
dropping the connection to the first mobile device responsive to the connection request from the second mobile device.

* * * * *